Aug. 4, 1931.　　　　F. H. BOGART　　　　1,817,668
COUPLING BORING AND THREADING MACHINE
Filed Feb. 20, 1926　　5 Sheets-Sheet 3
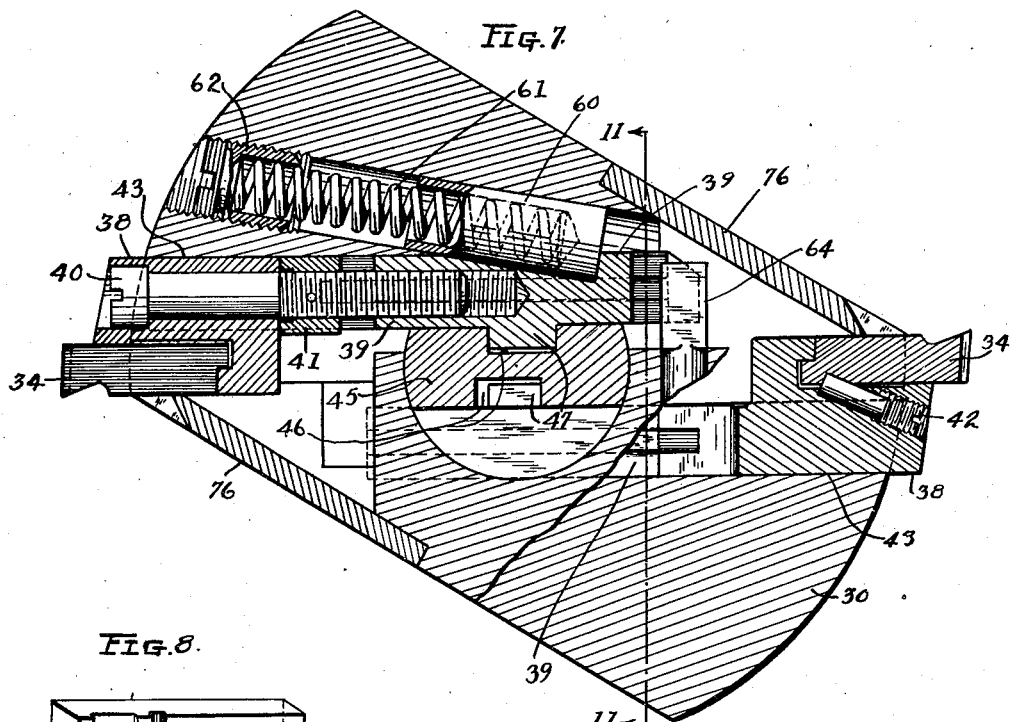
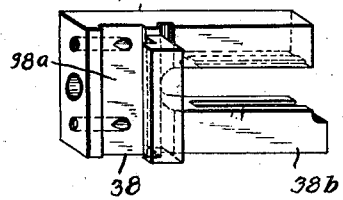
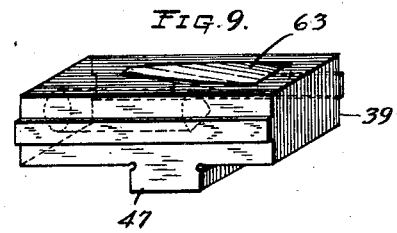
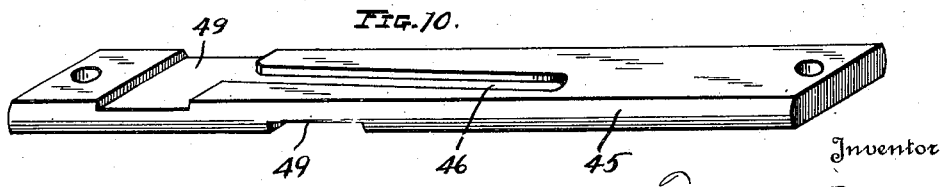

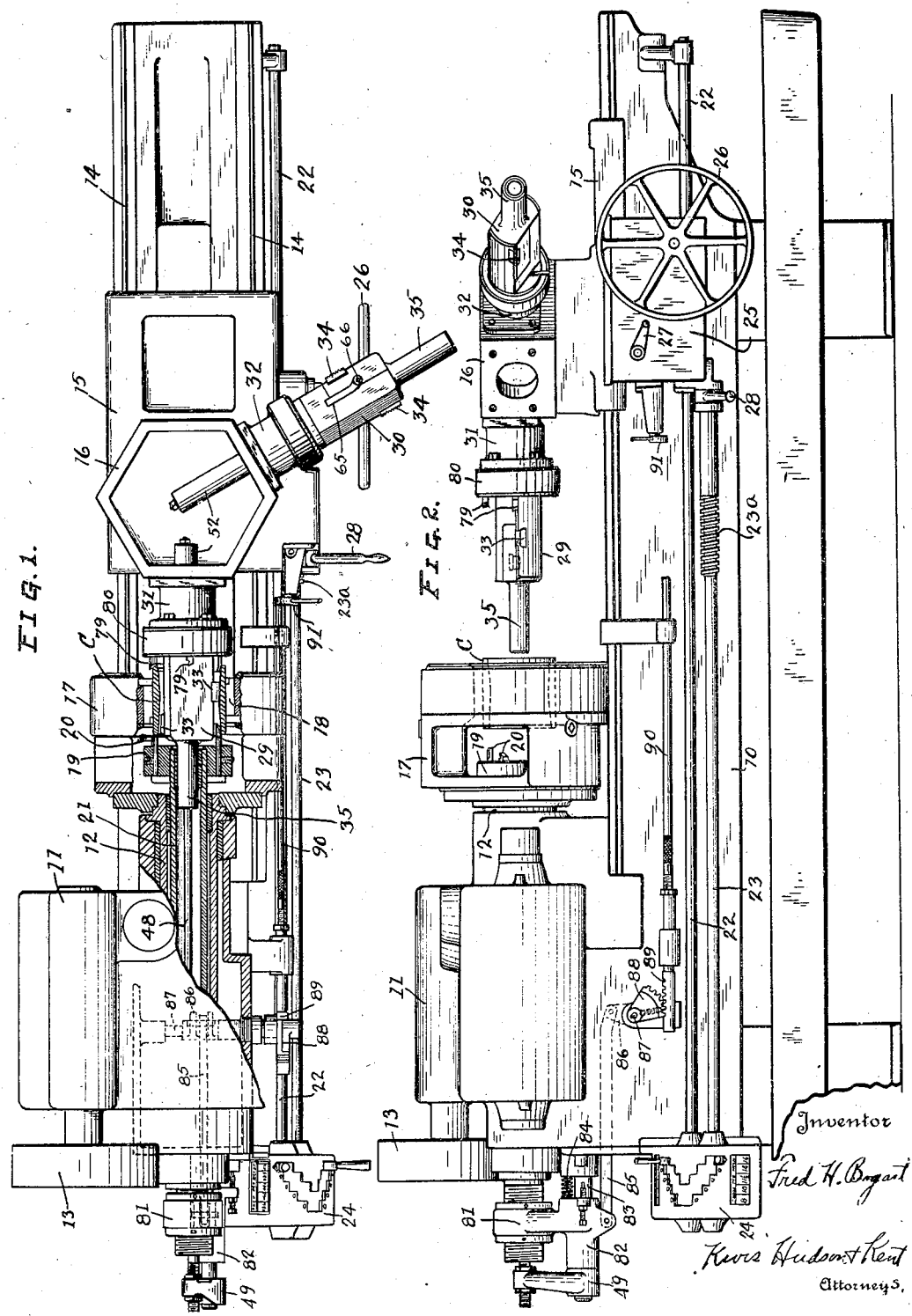

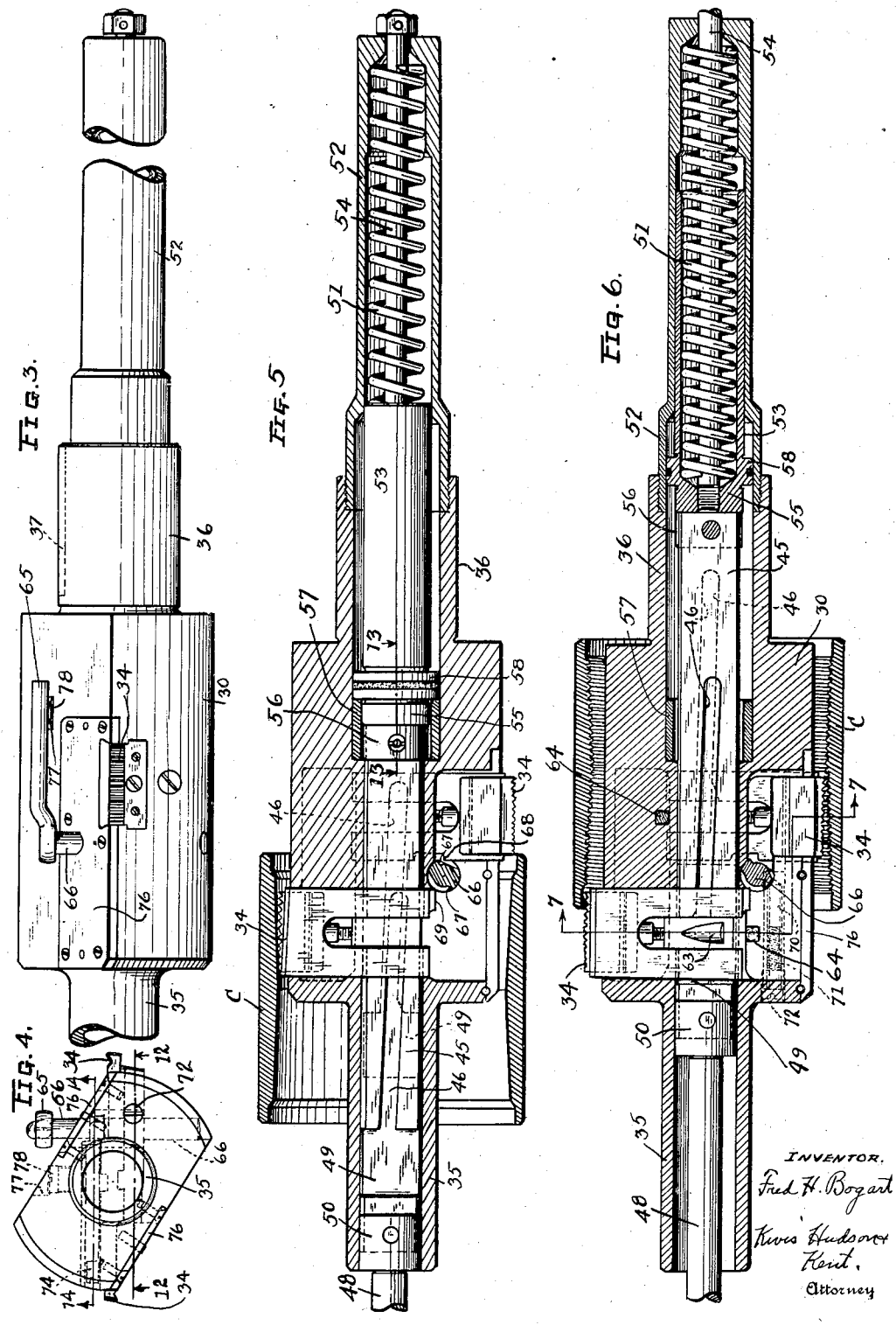

Aug. 4, 1931.       F. H. BOGART       1,817,668
COUPLING BORING AND THREADING MACHINE
Filed Feb. 20, 1926       5 Sheets-Sheet 4
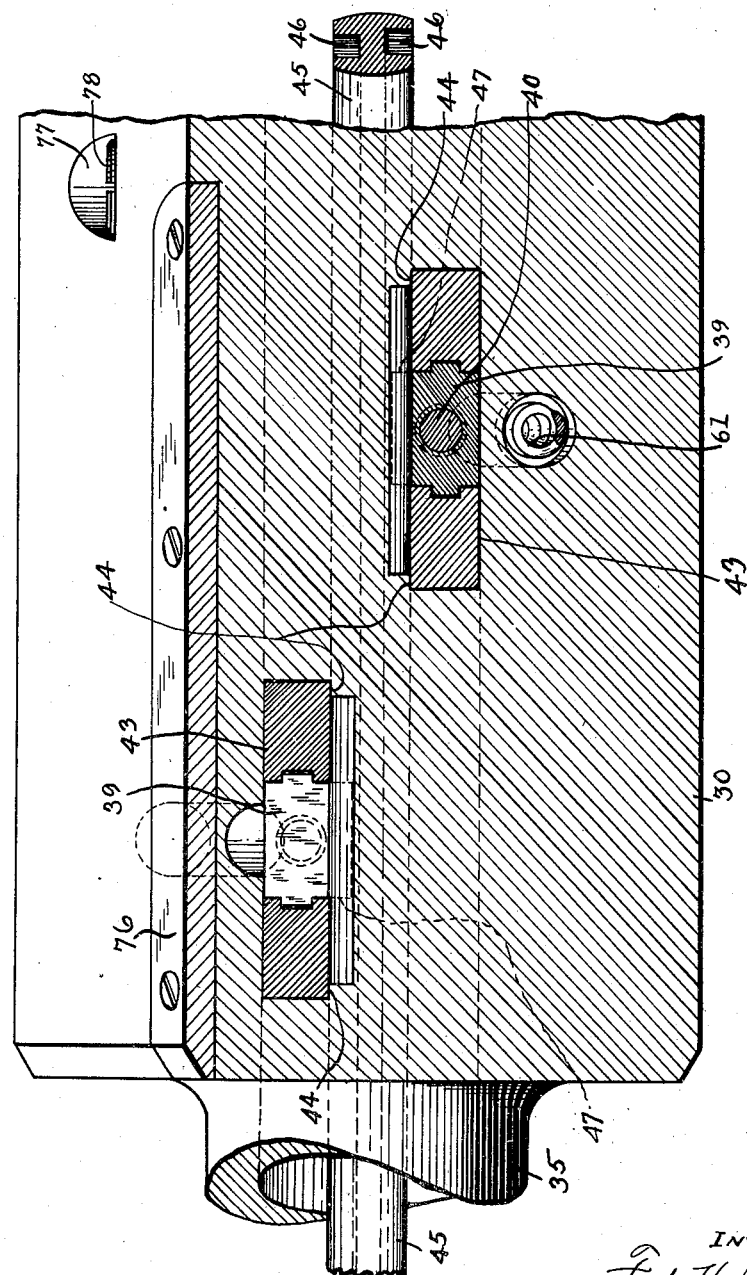

Aug. 4, 1931.  F. H. BOGART  1,817,668
COUPLING BORING AND THREADING MACHINE
Filed Feb. 20, 1926   5 Sheets-Sheet 5
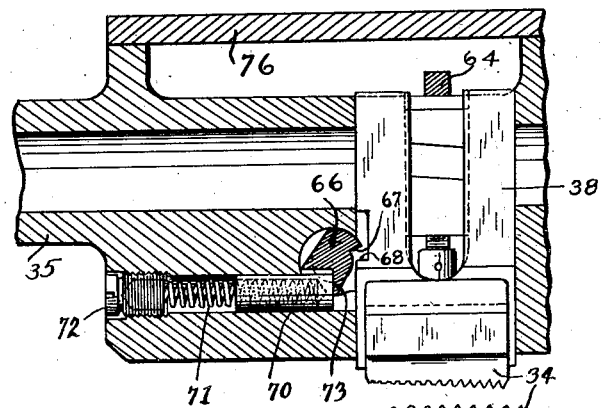
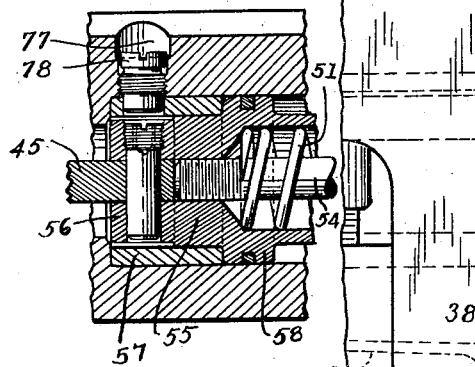
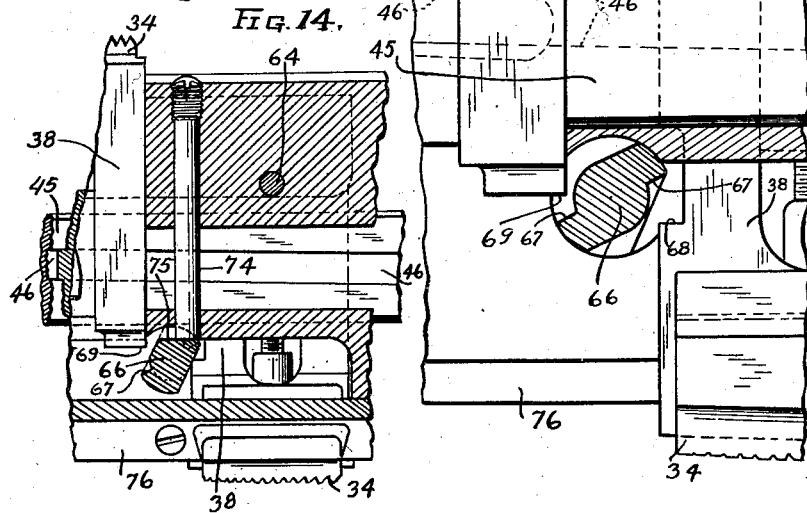

Patented Aug. 4, 1931

1,817,668

UNITED STATES PATENT OFFICE

FRED H. BOGART, OF CLEVELAND, OHIO, ASSIGNOR TO THE WARNER & SWASEY COMPANY, OF CLEVELAND, OHIO, A CORPORATION OF OHIO

COUPLING BORING AND THREADING MACHINE

Application filed February 20, 1926. Serial No. 89,518.

This invention relates to a coupling boring and threading machine and has for one of its objects to provide a machine which will bore and thread pipe couplings more accurately than is possible with any existing machines or methods.

Another object is to provide a machine wherein all the tools used in the entire cycle of operations are held concentric with respect to the axis about which the coupling and tools are relatively rotated.

A further object is to attain the above mentioned advantages or objects through the medium of attachments applied to a standard type of turret lathe, the attachments including not only means for properly boring and threading the couplings but also for counter-boring, chamfering and end-facing opposite ends of the coupling with all tools held centrally with respect to the axis of the spindle of the lathe, the spindle being preferably provided with a chuck securely holding the coupling with respect to the spindle axis throughout the cycle of operations.

Another object is to provide an improved boring head and an improved threading head which successively bore and thread the double tapers of the coupling, each head boring or threading both halves simultaneously by movement of the head into the coupling from one and the same end thereof.

Still further, the invention aims to provide self-cleaning boring and threading heads designed to automatically expel chips and the like which would otherwise clog and interfere with the operation of the heads.

A still further object is to design the head as to so limit backlash that the threading chasers cutting within the limit of the backlash will thread couplings well within the limit of accuracy required to meet present high standards.

The above and other objects are attained by my invention which may be briefly summarized as consisting in certain novel details of construction and combinations and arrangements of parts which will be described in the specification and set forth in the appended claims.

In the accompanying sheets of drawings Fig. 1 is a top plan view of a turret lathe equipped with my invention showing the boring head at or after the end of the boring operation, parts being shown in section; Fig. 2 is a side elevation of the same; Fig. 3 is a side elevation with parts broken away of one of the heads, which in this instance is the threading head; Fig. 4 is an end view of the same; Figs. 5 and 6 are longitudinal sectional views of the same showing also the coupling, Fig. 5 showing the parts at the start of the threading operation and Fig. 6 showing the parts in the positions which they occupy at substantially the close of the threading operation; Fig. 7 is an enlarged transverse sectional view of the threading head substantially along the irregular line 7—7 of Fig. 6; Fig. 8 is a perspective view of one of the parts of the tool slide; Fig. 9 is a perspective view of another part of a tool slide, this part for the sake of clearness being shown on a substantially larger scale than the co-operating part shown in Fig. 8; Fig. 10 is a perspective view of a cam bar forming a part of each tool head; Fig. 11 is a fragmentary longitudinal sectional view of a portion of the length of the head only, substantially along the line 11—11 of Fig. 7; Fig. 12 is a fragmentary longitudinal sectional view, substantially along a line 12—12 of Fig. 4; Fig. 13 is a fragmentary sectional view, substantially along the line 13—13 of Fig. 5; Fig. 14 is a fragmentary sectional view, substantially along the line 14—14 of Fig. 4; and Fig. 15 is a fragmentary sectional view showing on an enlarged scale certain details of Fig. 5.

Referring now to the drawings wherein I have shown my invention applied to a standard type of turret lathe for which my invention has particular utility, 10 represents the bed of the lathe 11 the head which is provided with a hollow spindle 12 adapted to be driven by the usual, or any suitable driving means which couples the spindle to the main driving element, which in this case is a pulley 13. The bed is provided also with the usual ways 14 on which is slidably arranged a turret slide 15 carrying a turret 16 on two faces of which are adapted to be secured the boring and threading heads.

In accordance with my invention the coupling to be bored, threaded and otherwise finished is rotated, and all the operations are performed from one setting with the coupling herein designated C securely held in a chuck rotated by the spindle, while the tools which perform the boring and threading operations are non-rotating but are endwise movable into the coupling from one end, the boring tools or cutters simultaneously boring the double taper in the two halves of the coupling on one forward movement of the turret, and the threading tools or chasers simultaneously threading the double tapered portions on the next forward movement of the turret.

Not only is the coupling securely held in the chuck but the chuck has a fixed relation or is securely held to the rotating spindle as distinguished from an indexing type of chuck employed in the method wherein half of the coupling is bored and threaded and then the chuck reversed, after which the opposite half is bored and threaded.

The chuck employed by me is designated as a whole by the reference character 17, this chuck being screwed onto the end of the spindle 12 and being provided with jaws 18 which securely hold the coupling at both ends. The details of the chuck which I prefer to employ are not shown or described herein as the same do not constitute a part of the present invention. It might be mentioned, however, at this point, that the chuck body has an open space formed between the chuck gripping jaws and the chuck flange which is screwed onto the spindle, to accommodate and to permit the endwise movement of a back-facing tool head 19 carrying tools 20 for facing, chamfering and counter-boring the inner end of the coupling C, this tool head being mounted on a non-rotating sleeve 21 mounted for endwise movement in the spindle 12.

A point to be noted, before passing on to the tool heads and their mountings, is that the coupling throughout the cycle of operations of boring and threading is rotated about the axis of the spindle and that its setting is undisturbed from the beginning to the end of the cycle.

Before describing the boring and threading tool heads which are mounted on the turret, I might mention that the turret slide is given a feeding movement during the boring operation by a shaft 22 and during the threading operation is given a feeding movement by a shaft 23, which are common in lathes. I do not regard it essential to show or describe with any great detail the mechanism for giving feeding or retracting movements to the turret, and it will be sufficient to state that the shafts 22 and 23 are operated as is usual from the head through the medium of gears in the gear box 24 mounted on the forward end of the bed, and the apron 25 of the turret slide will be provided with a suitable means for engaging and disengaging shafts 22 and 23.

Furthermore, as is customary in machines of this kind, I may employ rapid traverse mechanism for retracting the turret until the pilots on the ends of the tool heads are clear of the coupling so as to permit the turret to be indexed and for moving it forward until the tools are substantially in a position where the cutting operation begins. On the other hand the retraction of the turret and the forward movement up to the point where the turret is fed either through the medium of shaft 22 or shaft 23, may be accomplished by hand, a hand-wheel being shown at 26 for moving the turret slide forwardly and rearwardly.

The operation of stopping and reversing and changing from one feed to another may be accomplished automatically or manually, it being unessential to the present invention how these movements are controlled. In this instance the boring feed through shaft 22 is obtained by manually throwing a lever 27 and the threading feed by manually throwing a lever 28, both levers being carried by apron 25 and the movement of lever 28 being designed to actuate a follower adapted to engage the lead screw 23a of shaft 23.

The boring and chasing tools are carried, respectively, by boring and chasing tool heads which, as before stated, are mounted on faces of the turret 16. Both of these tool heads are provided with pilots which enable the forward ends to be centered in the spindle. Inasmuch as the faces of the turret in a lathe of this kind are bored from the spindle and since the tool heads have pilots which enter and are centered in the spindle, it is obvious that both the inner and outer ends of these tool heads are centralized with respect to the spindle axis. And, inasmuch as the tools are accurately held in the heads as will appear presently, it is obvious that the cutting and boring operations and in fact all the cutting operations including those employed in finishing the ends of the coupling and in fact all work is done about a fixed axis which is the axis of the spindle, the result being that the double tapers of the coupling are bored and threaded so as to be concentric with respect to each other and in alignment.

These results are highly important in view of the high standards of accuracy required at the present time, which standards are so high that only a small percentage of the couplings, bored and threaded by prior methods, will meet these standards.

The accurate results obtained by me are due in part to the construction of the boring and threading heads to be referred to presently, but in large measure to the manner in which the coupling and tool heads are mounted and centralized and to the fact that the mounting of the coupling is undisturbed from the beginning to the end of the cycle of operations and that the boring and threading tools held central with respect to the spindle, which rotates the coupling, as explained above, performing the boring and threading operations by being successively inserted into the coupling from one and the same end, the double tapers on both halves of the coupling being either bored or threaded, as the case may be, on one forward movement of the tool head. As far as I am aware this method of boring and threading couplings and a machine for carrying out this method are new with me.

In Figs. 1 and 2 I have shown the mounting of the boring and threading heads and their arrangement with respect to the other parts of the machine, including the coupling and the rotation chuck which supports it. In Figs. 2 to 11 I have shown in detail the threading head which is similar to the boring head except that the former is provided with means for collapsing the chasers so that they will clear the threads and permit the head to be retracted after the threading operation is completed.

In Figs. 1 and 2, 29 represents the boring head and 30 the threading head, the former being secured to one face of the turret through the medium of a sleeve-like mount 31 and the latter by a mount 32. Each of these mounts is centered and fastened by screws in the usual way to one of the faces of the turret.

The boring head supports two boring tools 33 and the threading head two chasers 34, the two tools of each head being in the same plane on opposite sides of the head but one in advance of the other and the two tools being adapted to bore or thread the two halves of the coupling, one boring or threading one half and the other simultaneously boring or threading the other half.

Each head 29 and 30 is composed of a substantially rectangular body or tool carrying portion provided at the front end with a hollow pilot 35, and at its rear end with a sleeve-like extension 36 which is fitted into the corresponding mount 31 or 32, the extension 36 being preferably provided with a keyway 37 (see Fig. 3) adapted to receive a key carried by the mount and being otherwise securely clamped in the mount. Each tool head body is bored centrally from end to end, the bored opening in the rear part of the body and extension 36 being somewhat larger than in the forward portion and pilot, as will be seen from Figs. 5 and 6.

The tools of each head are moved radially during the boring or threading operation, the front tool being in this instance moved radially outward and the rear or trailing tool being moved inward so that the two halves of the coupling will be bored or threaded on the right taper, and accordingly the tools of each head are mounted in transversely slidable holders or slides. The two slides for the threading head are identical with each other and with those carried by the boring head, and the boring and threading tools 33 and 34 are mounted in identical manner, hence the illustration of the tool slides of the threading head will suffice for both heads. Each slide is preferably composed of two relatively adjustable members 38 and 39 which are adapted to be held in fixed relation to each other and to be relatively adjusted so as to adjust the cutting tools by a screw 40, the latter being held in fixed relation to the outer member by a collar 41 (see Fig. 7). The part 38 is the outer member of the slide having a portion 38a fitted to receive the tool 33 or 34, as the case may be, which tool is held in position by diagonally disposed set screws 42 (see right-hand side of Fig. 7). The slide member 38 has a U-shaped inner portion 38b which straddles the inner slide member 39, the straddling portion 38b of the slide member 38 having a tongue and groove fit with the slide member 39. It might be noted at this point that while the cutting tools are arranged in a radial or diametrical plane the slides proper or the inner portions thereof are not radially disposed with respect to the head but are offset from the axis of the head, the inner portions of the slides overlapping and sliding in parallel planes on opposite sides of the axis of the head, where the slides have long bearing surfaces indicated at 43 and 44 in Fig. 7 and Fig. 11. The bearing surface 43 is a wide surface equal to the width of the slide, as indicated in Fig. 11, as this bearing surface opposes the reactive thrust of the work on the tool.

The cutting tools and tool slides of each head are adapted to be moved radially by a cam member 45 which is carried by and extends centrally in the head and consists of a flat bar with parallel opposite faces and rounded edges, the bar being adapted to be moved endwise through the opening which is bored centrally through the head. The rounded edges of the bar are turned on a radius corresponding to the radius of the bored opening through the pilot and major portion of the body of the head and engage the wall bore as illustrated in Fig. 7.

The cam member or bar 45 is provided on the opposite flat sides thereof with cam grooves 46 the inclination of which corresponding with the taper to be imparted to the coupling and this cam bar, as will be observed by reference to Fig. 7, lies between the over-lapping inner portions of the tool slides, the inner members 39 of which engage the opposite flat faces of the bar and are provided with tongues 47 each of which closely fits both sides of the corresponding cam groove 46.

As both the boring head and threading head are moved into the coupling the tool slides are given a lateral movement (the forward slide outward and the trailing slide inward) which movement is continued throughout the cutting operation, by causing the cam bar to be engaged by a stop member just preceding the beginning of the cutting operation and to be thus held stationary throughout the cutting operation. This stop member is in the form of a normally stationary rod 48 which extends through the spindle 12 and through the non-rotatable but endwise movable sleeve 21, and at its rear end is adjustably but fixedly supported in a bracket 49 mounted on the head 11. The opposite or forward end is adapted to enter the pilot 35 of the head and stops the cam member while the head is moving into the coupling C by engaging a cylindrical member 50 which is fixed to the forward end of the cam bar and is adapted to slide in the bore of the pilot 35, as indicated in Figs. 5 and 6. This cylindrical member is slotted transversely to receive the end of the cam bar and is pinned thereto.

At the opposite or turret end of both the boring and threading head there is a spring 51 which yieldingly opposes the stopping of the cam bar and also serves to restore the cam bar to its normal position in the head after the cutting operation is completed. This spring is in a spring barrel 52 screwed into the free end of the supporting extension 36 of the head, as clearly illustrated in Figs. 5 and 6, and the forward end of the spring is seated in a sleeve 53 which is slidably arranged in the barrel 52. Furthermore, the spring surrounds a rod 54 which extends freely through the outer end of the barrel and at its inner end is secured to the inner or head end 55 of the sleeve 53. The head end 55 of this sleeve is provided with an integral member 56 which is slotted to receive the rear or turret end of the cam bar and is pinned thereto, the same as the cylindrical member 50 at the opposite end of the bar.

As previously stated, the bore through the extension 36 of the head and through a portion of the body of the head is somewhat enlarged relative to the bore through the remainder of the head including the pilot. It is through this enlarged part of the bore that the cylindrical member 56 moves but on the return stroke when the bar is approaching its normal position this cylindrical member enters with a fairly close fit a bushing 57, seated in the bore of the head, as illustrated in Figs. 5 and 6. Furthermore, the head end of the spring sleeve 53 is provided with a piston portion 58 which engages with a close fit the enlarged part of the bore of the head and the opening in the inner part of the spring barrel 52 (see Fig. 6) this piston portion having packing rings so that the engagement of the piston in the cylinder formed by the spring barrel and enlarged portion of the bore of the head is substantially air tight.

It is to be seen that on the working stroke of the head the spring 51 is compressed as soon as the movement of the cam bar is stopped by the rod 48 and when the tool head is retracted the spring elongates and restores the cam bar to its normal position. On this return movement the piston 58 forces the air or other fluid out past the tool slides and cutting tools so as to clear the same of chips, this action continuing until the cylindrical member 56 enters the bushing 57. In the case of the threading head, and if desired also with the boring head, the return of the cam bar under the action of the spring 51 is very sudden so that the fluid is forcibly driven out past the tool slides and cutting tools as will be explained below.

At the end of the threading operation it is essential that the threading tools be retracted or collapsed so that the threads cut in the coupling will not be destroyed on the return stroke of the threading head. This may be desirable also with the boring head but it is not so essential with this head inasmuch as on the retraction of the boring head the oppositely tapered bored surfaces may or may not be scored by the boring tools depending upon the type of boring tool employed.

Accordingly, provision is made for collapsing the threading tool and similar provision may be made in the boring head. To accomplish the collapsing of the tools, cam bar 45 is provided at the ends of the cam slots 46 with transversely slotted portions 49 wide enough to accommodate the tongues 47 of the tool slides. These transversely slotted portions being located on opposite sides of the cam bar. The transversely slotted portions 49 are provided not only in the cam bar of the threading head but also in the cam bar of the boring head. They are so located that the tongues 47 of the tool slides will pass from the cam slots 46 into the transversely slotted portions 49 at the end of the normal threading stroke, and with the boring head they are located slightly beyond this point. The object of these transversely slotted portions of the boring head, when the latter is not provided with collapsing means, being to permit the removal of the tool slides, whereas when collapsing means is provided the transversely slotted portions not only permit the removal of the tool slides but also permits the collapsing of the tools.

For the purpose of automatically collapsing the tools at the end of the working stroke, each tool slide which is to be collapsed is engaged, as best shown in Fig. 7, by a plunger 60 actuated by a spring 61 retained by a nut 62 and mounted in an opening of the body of the tool head and disposed diagonally with the plane of movement of the slide. The inner member 39 of the slide has a rounded depression 63 cut in its outer side (see particularly Fig. 9) and the shoulder formed by the inner end of the depression is engaged by the end of the plunger 60, as shown in Fig. 7, the function of the spring and plunger being to move inwardly or retract the slide as soon as the tongue 47 slides out of the corresponding cam slot 46 into the transversely slotted portion 49 of the cam bar. It will be understood, of course, that both tool slides are equipped with retracting springs and plungers illustrated in Fig. 7.

Opposite the inner ends of both slides of the head stop pins 64 are provided, these pins being so located that at the end of the cutting stroke the slides are automatically retracted or collapsed inwardly until they engage the stop pins 64 and permit the tool head to be retracted with the cutting faces of the tools clear of the tapered surfaces previously operated upon, whether the operation be boring or threading.

On the return stroke of the tool head with its retracted tools and tool slides, the cam bar cannot move back into the head under the action of spring 61 until the tongues 47 on the tool slides are again brought into alignment with the cam slots 46. This is preferably accomplished manually after the head is retracted by the following means: The head is provided on the upper part thereof and within convenient reach of the operator with a lever 65 on the upper end of a shaft or rotatable pin 66 which extends down through the head along the side of the cam bar, as best indicated in Figs. 3, 4, 5 and 6. The lever-actuated rotatable pin 66 is provided inside the body of the head with a pair of shoulders 67 which are close to co-operating shoulders 68 and 69, one formed in the side of one tool slide and the other formed on the end of the other tool slide (see Fig. 5 and Fig. 15). These shoulders 67 are close to the shoulders 68 and 69 when the tool slides are brought to a stop by the pins 64 at the close of the collapsing motion; consequently after the return stroke of the tool head, the operator by swinging lever 65 and rotating pin 66 causes the shoulders 67 to engage shoulders 68 and 69 and thereby move the tool slides outwardly until the tongues 47 again come into alignment with the cam slots and when this occurs the compressed spring 51 in the spring barrel 52 gives the cam bar a quick forward stroke and in fact restores the parts to their previous positions ready for the next working stroke, the cam bar moving forwardly and the tongues sliding along the slots 46 to or adjacent the inner ends thereof.

While the cam bar is being thrust forwardly as just stated by spring 51, the piston 58 drives the air or other fluid through the head and out past the tool slides and as there is a sudden and forcible shot of fluid driven through the head and past the tool slides by this action, the tool head is effectively cleared of chips.

This quick return of the tool slide continues until the cylindrical member 56 at the rear end of the cam bar enters the bushing 57 whereupon there is a dash-pot action which pneumatically checks the stroke of the cam bar 45 under the action of the spring 51 near the end of the stroke.

When the operator releases lever 65 after the shoulders 67 of the rotatable pin 66 have moved the tongues 47 of the slides to a position such that they are in alignment with cam slots 46, the lever 65 and pin 66 are restored to their previous normal position, indicated in Figs. 3, 5 and 6 by a plunger 70 actuated by a spring 71 and retained by a screw plug 72 within an opening formed in the inner end face of the head, as best shown in Fig. 12, with the plunger 70 engaging a shoulder 73 on pin 66. When the rotatable pin 66 is thus returned by the spring-actuated plunger 70 it is stopped in normal position by an adjustable pin 74, (see Fig. 14) which also extends through an opening in the body portion of the head, the inner end of the pin being adapted to be engaged by a face or shoulder 75 of the rotatable pin 66. This pin 74 extends inwardly into the head at right angles to the spring 71 and plunger 70, as indicated in Fig. 4.

It was previously mentioned and the drawings show that while the tools themselves move radially in the head, the tool slides, or the major portions of them, have substantially a tangential arrangement, the inner portions of the slides overlapping each other on opposite sides of the cam bar 45. The purpose of this arrangement instead of one wherein the slides themselves are radially disposed, i. e., the purpose of arranging the slides so that they overlap each other in the head, is to provide a large bearing surface for the slides in the head. This feature, coupled with the fact that the tongues 47 of the tool slides each engage both sides of the associated cam slot 46, together with the fact that the parts are accurately machined, hardened and fitted, so limit the backlash that the chasers acting within the limit of whatever backlash exists, thread the couplings within the limit of accuracy required by present high standards.

It will be observed that the rounded edges of the flat cam bar closely engage the bore of the head from the pilot end of the body of the head to the bushing 57 and that the cylindrical member 50 closely engages the bore in the pilot while at the same time the opposite flat faces of the cam bar closely engage the inner overlapping sides of the two tool slides, thus insuring an ample and proper support of the cam bar centrally of the body of the head and at all times in proper relation to the tool slides which are closely fitted and amply supported in accurately milled or cut ways in the body of the head.

Diagonally opposite milled openings are provided in the body of the head to accommodate the tool slides and tools and the portions of the openings not occupied by the slides and the tools which they support are closed by cover plates 76 held in place by screws as indicated, but these plates have no function in supporting the tool slides and are provided to close what would otherwise be open spaces. Furthermore, the tool slides can be removed without removing the plates 76, this being possible when the tongues 47 of the slides lie in the transversely slotted portions 49 of the cam bar and after the threaded plugs 62 have been backed away sufficiently to permit the spring-pressed plungers 60 to be disengaged from the recesses formed in the outer faces of the slides.

In removing the tool slides, it may be desirable to turn the rotatable pin 66 slightly so that the tool slide which has a notch in its side to accommodate one of the shoulders 67 and which must be moved past the pin 66 in removing the slide, will clear the pin. This turning or adjustment of the normal position of the pin 66 can readily be done by slightly backing away pin 74 of Fig. 14.

As before stated, the inclination of the cam slots 46 corresponds to the taper which the coupling is to have. If the taper of the coupling is to be varied, the cam bar is replaced by one whose cam slots have the desired inclination. The cam bar can be removed and replaced with one having the proper taper by sliding it out through the pilot end of the head after the tool slides are removed but generally the parts are so proportioned that it is desirable to first remove the pin through the slotted cylindrical member 56 at the rear or turret end of the cam bar, which screw pin fastens the cylindrical member extension 56 to the cam bar, and to permit this to be done the head is provided with an opening 77 which opening is normally closed by a screw plug 78, which is shown in Fig. 13 and the position of which is indicated in Figs. 3, 4 and 11. By removing the screw 78 access will be had to the pin which fastens the cylindrical member 56 to the cam bar when the cam bar is in its normal position indicated in Figs. 5 and 13.

It was already stated that the coupling is not only bored and threaded but the ends are finished by counterboring, chamfering and end-facing tools and I have mentioned that the counter-boring, chamfering and end-facing tools which finish the inner end of the coupling are carried by a tool holder 19 mounted on a sleeve 21 endwise movable in the spindle 12. Corresponding tools 79 which finish the outer end of the coupling are mounted on a tool holder 80 (see Figs. 1 and 2) which is secured to the outer faces of the mount 31 for the boring head so as to surround a portion of the extension 36 of the boring head, which extension is adapted to be secured in the mount 31, as already explained.

The operation of the machine is as follows: After a coupling is securely mounted in the chuck 17 and the machine is set in operation, the turret slide with the turret so indexed that the boring head is in line with the spindle is advanced so as to run the boring head into the coupling. As the boring head advances, the pilot 35 thereof enters the hollow spindle and in fact enters the non-rotating sleeve 31 which is centered in the spindle. As the pilot enters this sleeve the rod 48 enters the pilot and at the proper instant the forward end of this rod engages the cylindrical member 50 at the forward end of the cam bar and stops the movement of the cam bar and holds it stationary during the further forward travel of the boring head. The stopping of the cam bar in this manner causes the cam bar to feed the tool slides laterally, moving the forward slide outwardly and the trailing slide inwardly, as already explained. By reason of the forward feed of the tool slides while moving with the head and the lateral feed of the slides in the head both halves of the coupling are simultaneously operated or are given the double taper. Just before the boring head completes its forward stroke, the counter-boring, chamfering and end-facing tools carried by the head 80 come into action and finish the outer end of the coupling and at the same time the tool holder 19 carrying the tools 20 is advanced and the inner end of the coupling is similarly finished. The advancing of the tool head 19 is accomplished by the following means: The rear end of sleeve 21 (which at its forward end carries the tool holder 19) is threaded and is adjustably mounted in the boss of an arm 81 carried by a slide 82 on a bracket 83 secured to the head 11 as best shown in Fig. 2. The sleeve 21 and slide 82 are normally held in retracted position by a compression spring 84 arranged between the slide and the head, as indicated in Fig. 2. To the lower part of the slide is attached a link 85 which at its forward end is connected to a crank 86 on a rock shaft 87 carrying at its outer end a gear sector 88 meshing with a rack portion 89 of a rod 90 extending horizontally along the front side of the bed 10, as clearly shown in Figs. 1 and 2. On the saddle 25 of the turret slide there is provided an abutment 91 which is rotatably secured and is adapted to be thrown to position such that it will engage the forward end of the rod 90 and to another position such that it will not contact the rod 90 on the forward stroke of the slide.

Just prior to the stroke of the turret which brings the boring head into the coupling, the member 91 is so turned that it will engage the rod 90 near the end of the stroke and shift the rod 90 in a direction toward the head of the machine so that the rack 89, sector 88 and link 85 will move the slide toward the head and bring the tools carried by tool head 90 into operative position so as to finish the inner end of the coupling simultaneously with the finishing of the outer end thereof by the tools carried by the head 80. On the retraction of the boring head, the sleeve 21 is retracted by the spring 84 and before the next forward movement of the turret the operator will shift the member 91 so that the tool holder 19 will not be actuated during the threading operation.

When the boring head is retracted the tool slides will be moved laterally to their normal positions by the tongues 47 following along the cam slots. That is to say, they will have this movement providing the boring head is not provided with the collapsing means but if it, like the threading head, is provided with the collapsing means, the collapsing will take place suddenly, as will be explained in connection with the threading head.

After the return of the turret slide following the boring operation, the turret is indexed so as to bring the threading head in line with the spindle and then the turret is given another forward s roke, carrying the threading head into the coupling and both halves of the coupling are simultaneously threaded, this forward stroke being somewhat longer than the boring stroke in order that the chasers will travel from the position shown in Fig. 5 to that shown in Fig. 6, so as to cause the threads to be accurately cut from the counterbore at one end of the coupling to the counterbore at the other end with the threads in one half continuous with those in the other half.

After a very slight movement of the head beyond the position shown in Fig. 6, the tongues of the slides ride out of the cam slots into the transversely slotted portions 49 of the cam bar, causing the quick collapse of the tools. Then the movement of the turret slide is reversed and the threading head is retracted and at or about the time the head is fully retracted, the operator swings lever 65 and this brings the tongues of the slides into such relation with the cam slots that the spring 51 will give the cam bar quick thrust forward causing the air or other fluid in advance of the piston 58 to be driven into the head and out past the tool slides.

The operation now being completed, the machine is stopped, another coupling is placed in the chuck, whereupon the cycle of operations explained above is repeated.

What I claim is:

1. In a machine of the character described, a work holder and a tool holder one movable relative to the other, the tool holder being provided with a tool head having a pair of cutting tools, a pair of slides carrying the same and slidingly supported by the head in parallel planes so as to overlap each other, and a cam member carried by the head and arranged between the overlapping portions of the slides and adapted to move the same laterally for feeding purposes on the occurrence of relative longitudinal movement between the head and cam member during the cutting operation.

2. A tool head having a pair of cutting tools one in advance of the other movable laterally in a diametrical plane, a pair of off center slides slidingly supported by the head in overlapping relation with respect to each other and a centrally disposed cam member arranged between the overlapping portions of the slides and adapted to move the slides laterally on the occurrence of relative movement between the head and cam member.

3. A tool head comprising a tool head body having laterally movable tool holding slides arranged in parallel planes one in advance of the other and in overlapping relation and a cam member extending through the body and provided with a pair of oppositely disposed flat faces engaging the overlapping portions of the slides.

4. A tool head comprising a body having a central bore and having laterally movable off center tool carrying slides, a cam member movable relative to the body and extending through the bore, said cam member having edges engaging the wall of the bore and having flat oppositely disposed surfaces extending between the slides and having cam portions engaging the slides.

5. A tool head comprising a body having a central bore and having laterally movable tool carrying slides, a cam member movable relative to the body and extending through the bore, said cam member having edges engaging the wall of the bore and having flat oppositely disposed surfaces engaging the slides, and said cam member additionally having a cam groove.

6. A tool head comprising a body having a laterally movable tool slide, a cam member in the body and movable relative thereto, said cam member having a cam slot terminating in an enlargement and means associated with the slide engaging the slot and adapted to enter such enlargement.

7. A tool head having a laterally movable slide, a cam member in the tool head and movable relative thereto and having means for actuating the slide laterally, means for collapsing the tool at the end of a cutting stroke and means for giving the cam member a quick return movement to its normal position.

8. A tool head comprising a body having a laterally movable slide carrying a tool, a cam member movable in the body for actuating the slide laterally, means for collapsing the tool at the end of a cutting stroke after the body and cam member have been moved relatively from normal position and spring means for causing a quick return of the cam member to its normal position relative to the body.

9. A tool head comprising a body having a bore and provided with a laterally movable tool slide, a cam member in the body and movable through the bore to actuate the slide said cam member having a piston portion for causing a flow of fluid through the head.

10. A tool head comprising a body having a pair of laterally movable slides, a cam member for actuating the slides laterally on the occurrence of relative movement between the body and cam member, a spring for opposing said relative movement and piston means actuated by the spring for forcing fluid out past the slides when said spring returns the cam member to its normal position relative to the head.

11. In a machine of the character described, a rotatable coupling support, a tool head carrying a pair of laterally movable cutting tools movable into the coupling, a cam member movable through the head to actuate the tools laterally, means for stopping the movement of the cam member as the head is inserted into the coupling, means for automatically collapsing the tools at the end of the cutting stroke, a spring compressed during the movement of the head while the cam member is stopped and means for releasing the spring so that it may restore the cam member to its former position in the head.

12. In a machine of the character described, a rotatable coupling support and tool head carrying a pair of laterally movable cutting tools movable into the couplings, a cam member movable through the head to actuate the slides laterally, means for stopping the movement of the cam member as the head is inserted into the coupling, means for automatically collapsing the tools at the end of the cutting stroke, a spring compressed during the movement of the head while the cam member is stopped, means for releasing the spring so that it may restore the cam member to its former position in the head and piston means associated with the spring for forcing fluid through the head and out past the tool slides when the spring returns the cam member to its normal position.

13. In a machine for boring or threading pipe couplings on a double taper, a coupling holding member and a tool holding member one movable toward and from the other and one having provision for causing relative rotation between the coupling and tools, a tool head carried by the tool holding member and provided with two cutters spaced longitudinally thereof, and a cam bar extending through the cutter head in camming relation with the two cutters, the cutter head and cam bar being movable relatively so that during the cutting operation one cutter will be moved inwardly and the other will be moved outwardly by said relative movement, the spacing of the cutters relative to the length of the coupling being such that one cutter cuts the taper on one half of the coupling at the same time that the other cutter cuts the taper on the other half of the coupling.

14. In a device for simultaneously cutting opposite tapered halves of a pipe coupling, a tool head adapted to be applied to a tool holding member of a machine tool and provided with a longitudinal opening extending therethrough and with two guideways extending laterally from the opening, a pair of slides movable along said guideways and adapted to be provided with cutters, cam means in said opening and movable longitudinally thereof relative to the head, said cam means being in camming relation with the slides so as to simultaneously move them laterally one inward and the other outward on the occurrence of relative movement between the head and cam means during the cutting operation.

15. In a device for simultaneously cutting oppositely tapered halves of a pipe coupling, a cutter head adapted to be applied to the tool holding member of a machine tool, said cutter head having a longitudinal opening and having two guideways extending laterally from the opening, a cam bar in said opening adapted to be moved relative to the head lengthwise thereof during the cutting operation, a pair of slides mounted in said guideways, the outer portions of the slides adapted to be provided with cutters and the inner portions of the slides being in camming relation with the cam bar so that on the occurrence of relative axial movement during the cutting operation one slide will be fed inwardly and the other will be fed outwardly.

16. In a device for simultaneously cutting oppositely tapered halves of a pipe coupling, a cutter head adapted to be applied to the tool holding member of a machine tool, said cutter head having a longitudinal opening and having two guideways extending laterally from the opening, a cam bar extending through the opening and adapted to be moved relative to the head lengthwise of the opening during the cutting operation, a pair of slides mounted in said guideways, the outer portions of the slides adapted to be provided with cutters and the inner portions of the slides being in camming relation with the cam bar so that on the occurrence of relative axial movement between the head and bar one slide will be fed inwardly and the other will be fed outwardly, and means for adjusting the outer cutter holding portions of the slides relative to the inner cam engaging portions of the slides.

17. A tool head having a laterally movable tool slide, a cam member extending through the head and movable relative thereto during the cutting operation, said cam member being in camming relation with the slide so as to impart to the latter a lateral feed, means for collapsing the tool at the end of the cutting operation and separate means for giving the cam member a return movement to its normal position in the head.

In testimony whereof, I hereunto affix my signature.

FRED H. BOGART.